United States Patent Office 3,524,833
Patented Aug. 18, 1970

3,524,833
POLYMERS OF HYDROXY KETONES AND HYDROXY SULFONES
Roland Darms, Wilmington, Del., assignor to E. I. du Pont de Nemours and Company, Wilmington, Del., a corporation of Delaware
No Drawing. Continuation-in-part of application Ser. No. 669,295, Sept. 20, 1967. This application Jan. 6, 1969, Ser. No. 789,414
Int. Cl. C08g *33/10*
U.S. Cl. 260—47
4 Claims

ABSTRACT OF THE DISCLOSURE

Polymers are provided of poly(hydroxyketones) and poly(hydroxysulfones) of an inherent viscosity sufficient to form tough self-supporting shaped structures such as, for example, film structures.

---

The present application is a continuation-in-part of copending application Ser. No. 669,295, filed on September 20, 1967, now abandoned.

RELATED ART

Polyketone polymers are known in such art as British Pat. No. 971,227, published Sept. 30, 1964. Polyhydroxyketone polymers now also are known in the U.S. patent to S. Tocker No. 3,324,199, dated June 6, 1967, but they are of low molecular weight.

STATEMENT OF THE INVENTION

The present invention provides polymers of the structural formula:

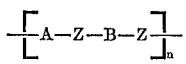

where $n$ is a number sufficient to provide a polymer having an inherent viscosity high enough to form self-supporting polymer shapes; A is:

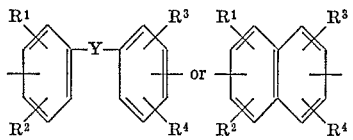

where $R^1$, $R^2$, $R^3$ and $R^4$ are of the group consisting of H, OH and alkyl of 1 to 4 carbon atoms, provided at least one of the substituents is OH;
Y is a covalent bond or —O—; Z is

or

and B is

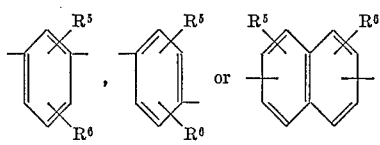

where $R^5$ and $R^6$ are halogen, OH or H. The polymers preferably are composed of sufficient of the structural units to provide a polymer having an inherent viscosity of at least 0.20, and preferably 0.75 to 2.0 or more, measured on a 0.5 weight percent solution of the polymer in a solvent such as concentrated sulfuric acid, dimethylformamide or dimethylacetamide at 30° C. These polymers are soluble in many solvents such, for example, as pyridine, N,N-dimethylacetamide, N,N-dimethylformamide, sym-dichlorotetrafluoracetone monohydrate, concentrated sulfuric acid, liquid hydrogen fluoride and the like. Self-supporting structures, e.g. film, that are tough can be made from the polymers employing solution casting, melt-pressing and similar techniques. These polymers are highly adherent materials, and those having melt flow below the decomposition point are particularly useful as heat-sealable coatings and adhesives. The polymers can also be used in fiber form or in laminar structures with other materials such as metal foils or other polymeric materials or both.

The polymers of this invention are prepared by subjecting to polymerization conditions in the presence of a catalytic amount of boron trifluoride and hydrogen fluoride, one or more mono- or polyphenolic compounds and one or more aromatic diacids or the corresponding diacid halides. Illustrative phenolic compounds, which provide the A portion of the polymer, include 2-hydroxybiphenyl, 3-hydroxybiphenyl, 4-hydroxybiphenyl, 2,2'-dihydroxybiphenyl, 3,3'-dihydroxybiphenyl, 4,4'-dihydroxybiphenyl, 2,4'-dihydroxybiphenyl, 2,3-dihydroxybiphenyl, 2,5-dihydroxybiphenyl, 3,4-dihydroxybiphenyl, 3,5-dihydroxybiphenyl, 2,2',5-trihydroxybiphenyl, 3,3',4,4'-tetrahydroxybiphenyl, 3,3',5,5'-tetrahydroxybiphenyl, 3,3'-dimethyl-4,4'-dihydroxybiphenyl, 2-hydroxydiphenyl ether, 3-hydroxydiphenyl ether, 2,2'-dihydroxydiphenyl ether, 3,3'-dihydroxydiphenyl ether, 4,4'-dihydroxydiphenyl ether, 2,4'-dihydroxydiphenyl ether, 2,2'-dimethyl-4,4'-dihydroxydiphenyl ether, alpha naphthol, beta-naphthol, naphthalene-1,5-diol, naphthalene-1,7-diol, naphthalene-2,6-diol and naphthalene-2,7-diol. The compounds with two hydroxy groups are particularly preferred. Of course other phenolic compounds can be used as well as the listed compounds, and they may be substituted with any substituent that does not interfere with the desired polymerization.

Suitable diacids which may be employed as such or as the corresponding acid halides include naphthalene-1,5-dicarboxylic acid, 2,5-dihydroxyterephthalic acid, isophthalic acid, terephthalic acid, 2,5-dichloroterephthalic acid, naphthalene-2,6-dicarboxylic acid, naphthalene-1,5-disulfonic acid and naphthalene-2,6-disulfonic acid. These compounds provide the B portion of the polymer. Other diacids and the corresponding acid halides, unsubstituted or substituted with non-interfering moieties, can as well be used.

The amount of catalyst employed in the polymerization reaction can vary over a wide range. The specific amount of catalyst actually used will ordinarily provide at least a molar equivalent, and preferably at least 2 or 3 moles, of boron fluoride per carbonyl and/or sulfonyl group in the monomeric reactants used. Preferably, less than 15 or 20 moles of boron fluoride per such group will be used, though greater quantities, i.e. 50 to 75 moles of boron fluoride per carbonyl or sulfonyl group in the starting reactants, can be used if desired.

The amount of hydrogen fluoride will be that which provides in excess of a molar equivalent of HF based on the amount of boron fluoride used, and preferably about 2 to about 10 moles thereof for each mole of boron fluoride. The hydrgen fluoride serves both in a catalytic capacity and as a solvent and therefore the amount of excess can be greater than 10 moles, say, 20 or 30 moles, per mole of boron fluoride without interfering with the reaction.

The polymerization reactions of the invention proceed within a fairly broad temperature range, ranging from as low as only a few degrees above the freezing temperature of the reactants to as high as 100° or 150° C. For the most part, temperatures of about 100° C. or less are desirable to minimize any tendency for the product to be insoluble or degrade. Since it will sometimes be convenient to initiate the reaction at very cold temperatures, initial temperatures as low as −70° C. or thereabouts can be employed. Then the temperature is permitted to increase by the exothermic reaction or by external heating to a somewhat higher level. In general, temperatures between about −40° C. and about 60° C are suitable. The particular temperatures used, as well as the initial, and final temperatures, and the way the temperature increases if there is a variation during the reaction, will of course depend on the particular monomers used, catalytic ratios, whether or not the process is a batch or continuous one, the results desired, etc., as will be readily understood by persons skilled in the art.

Polymers of the invention can be produced by the above process in reaction times as low as 15 or 20 minutes and as high as 10 or 20 hours or more. Even a minute or less is contemplated under some circumstances such as continuous operations. Very satisfactory polymers of high molecular weight are readily obtainable in a reaction period of about 1 or 2 hours. The precise duration of the reaction period will of course depend on the temperature of the reaction, the amount of catalyst present, whether or not a single temperature is maintained throughout the reaction or whether the temperature is increased as the reaction proceeds, and the like.

The process of this invention can be conveniently be carried out at autogenous pressure, but pressures in excess thereof are not considered detrimental.

Although the process of the present invention proceeds satisfactorily under anhydrous conditions, the presence of a small amount of water will not be overly objectionable and under some circumstances may even enhance the catalytic effect of the mixture of boron fluoride and hydrogen fluoride. Ordinarily, no advantages are obtained using amounts of water in excess of about 1% by weight based on the total weight of the catalyst mixture used.

The polymer resulting from the process of this invention can be isolated, recovered and, if desired, purified according to conventional techniques. For example, the resulting mass can be dissolved in a suitable solvent, filtered to remove undissolved impurities, and precipitated in a suitable non-solvent. As a further example, the copolymer of biphenol with terephthaloyl chloride can be discharged into saturated aqueous sodium acetate, followed by filtration, water and bicarbonate washing, refiltering and vacuum drying to yield a good purity product.

Typical practice of the process as exemplified and used in the examples given hereinafter is as follows: The phenolic compound and the acid or acyl halide reactants are placed in a corrosion-resistant pressure vessel, generally fabricated from stainless steel or silver-lined stainless steel. The vessel is closed, cooled to −60° C., and placed under vacuum in order to remove the air from the vessel. Volatile reactants such as hydrogen fluoride and boron trifluoride are condensed or injected into the vessel. The vessel is put onto a shaker or rocker apparatus and heated for specified times and at specified temperatures under autogenous pressure. The vessel is permitted to cool to room temperature, and is degassed by venting the volatile by-products from the vessel. The tube is then opened for recovery of liquid or solid reaction products. Thereafter the products are purified by conventional techniques.

EXAMPLE 1

In accordance with the general procedure outlined above, a 150-milliliter stainless-steel pressure vessel was charged with 5.6 grams (0.03 mole) of 2,2'-biphenol (2,2'-dihydroxybiphenyl), 6.1 grams (0.03 mole) of terephthaloyl chloride, 20 grams (1.0 mole) of hydrogen fluoride and 34 grams (0.5 mole) of boron trifluoride. The vessel was heated for 1 hour at 25° C. and for 1 hour at 50° C. The solid reaction product was discharged into a saturated aqueous sodium acetate solution. The insoluble product was collected by filtration, and then washed consecutively with water, 5% aqueous sodium bicarbonate solution and water, then heated in water under reflux for 30 minutes, again collected by filtration and dried in vacuum. The brown product amounted to 9.45 grams.

The infrared spectrum of this product was in agreement with that expected for the poly(hydroxyketone). The product was soluble in concentrated sulfuric acid, and almost completely soluble, with only a small amount of gel, in N,N-dimethylacetamide (DMAC). The inherent viscosity of this product was 1.24 (0.5% solution in concentrated sulfuric acid at 30° C.). For comparison, a control sample of a non-hydroxylated polymeric ketone of inherent viscosity of about 0.63 prepared by the procedure described above by reacting equimolar amounts of biphenyl and terephthalic acid chloride was found to be insoluble in DMAC.

The poly(hydroxyketone) was further purified by dissolving it in concentrated sulfuric acid and reprecipitating in water, followed by drying. Although the polymer did not melt or flow upon heating to 350° C., it did adhere to aluminum when pressed at 350° C. at 20 tons pressure for about 1 minute.

A solution of 2 grams of the poly(hydroxyketone) polymer in 18 grams of distilled liquid hydrogen fluoride was prepared. A film was cast from this solution on a polyethylene plate, using a 15-mil doctor knife. After evaporation of most of the hydrogen fluoride, the resulting film was soaked and washed in methanol. The film was clamped to a frame and dried for 2 hours at 120° C. The resulting yellowish film was tough, had a modulus of 355K p.s.i., an elongation of 2%, a tenacity of 6K p.s.i., a density of 1.181 grams per cubic centimeter, and a zero strength temperature of about 486° C.

EXAMPLE 2

A 150-ml. stainless-steel pressure vessel was charged with 5.60 grams (0.03 mole) of 2,2'-biphenol, 3.05 grams (0.015 mole) of terephthaloyl chloride, 3.05 grams (0.015 mole) of isophthaloyl chloride, 20 grams (1.0 mole) of hydrogen fluoride and 34 grams (0.5 mole) of boron trifluoride. The vessel was heated for 1 hour at 25° C. and for 1 hour at 50° C., under autogeneous pressure. The viscous reaction product was discharged into a saturated aqueous sodium acetate solution. The precipitate which formed was collected by filtration and washed consecutively with water, 5% aqueous sodium bicarbonate solution and water, then heated in water under reflux for 30 minutes, again collected by filtration and dried under vacuum.

The product, 9.25 grams of brownish flakes, had a stick temperature on a melting bar of 370 to 380° C. The polymer was soluble in DMAC, and had an inherent viscosity of 1.43 (0.5% solution in DMAC at 30° C.). Its infrared spectrum was in agreement with that expected for the poly(hydroxyketone). For comparison, a control sample of a non-hydroxylated polymeric ketone of inherent viscosity of about 0.22 prepared by the procedure described above by reacting equimolar amounts of biphenyl and a 50/50 mixture by weight of terephthaloyl chloride and isophthaloyl chloride was found to be insoluble in DMAC.

A solution of 2 grams of the polymer in 18 milliliters of DMAC was cast into a film on a glass plate with a 20-mil doctor knife. The film on the glass plate was heated at 110° C. for 10 minutes and then placed in water for 5 minutes; the film was then removed from the glass, clamped onto a frame and dried in an air oven for 5 minutes at 65° C., 30 minutes at 100° C. and finally in a low pressure nitrogen atmosphere for 24 hours at 125° C. The resulting film was yellow, tough and clear. Tough film of this polymer was also cast from a solution of 1 gram of the polymer in 9 milliliters of hydrogen fluoride, by casting onto a fluoropolymer plate.

The polymer was also coated from DMAC solution onto substrates of paper and polyvinyl fluoride fiilm (the latter pretreated with a solution of sodium dichromate in sulfuric acid). Adhesion to both substrates was excellent. The adhesion of the coated polyvinyl fluoride film sample was tested by pressing a piece of pressure-sensitive adhesive tape onto the coating and then quickly stripping it off. In this test, the poly(hydroxyketone) coating remained firmly attached to the polyvinyl fluoride film substrate. This coated substrate also passed the same adhesion test after a sample of it was heated in water at 80° C. for 2 hours.

Films of the polymer were also fabricated by melt pressing at 365° and 380° C. Similar melt pressed films adhered strongly to aluminum foil.

The zero strength temperature of the film cast from DMAC was 453° C. The physical properties of the film were as follows: at 23° C., the modulus was 567K p.s.i., the elongation 1.7%, and the tenacity 9K p.s.i.; at 105° C., the modulus was 560K p.s.i., the elongation 1.7%, and the tenacity 7.8K p.s.i.

EXAMPLE 3

A 150-milliliter stainless-steel pressure vessel was charged with 4.65 grams (0.025 mole) of 4,4'-biphenol, 5.88 grams (0.025 mole) of 2,5-dichloroterephthalic acid, 20 grams (1.0 mole) of hydrogen fluoride and 34 grams (0.5 mole) of boron trifluoride. The vessel was heated at 50° C. for 1 hour and at 75° C. for 3 hours. The liquid reaction product was discharged into a saturated aqueous sodium acetate solution. The precipitate which formed was collected by filtration, washed with water, 5% sodium bicarbonate solution and water, heated in water under reflux for one hour, collected again by filtration and dried under vacuum.

There were obtained 7.85 grams of a yellow solid product whose infrared spectrum was in agreement with that expected for the poly(hydroxyketone). The polymer was soluble in N,N-dimethylformamide (DMF) and sym-dichlorotetrafluoroacetone monohydrate. The inherent viscosity of the polymer was 1.12 (0.5% by weight solution in DMF at 30° C.)

A solution of 2 grams of the polymer was prepared in 23 milliliters of sym-dichlorotetrafluoroacetone monohydrate; a small amount of insoluble material was removed by filtration; from the filtrate a film was cast and dried under nitrogen. The film which resulted was yellow and self-supporting.

EXAMPLE 4

A 150-milliliter stainless-steel pressure vessel was charged with 5.6 grams (0.03 mole) of 2,2'-biphenol, 6.1 grams (0.03 mole) of isophthaloyl chloride, 20 grams (1.0 mole) of hydrogen fluoride and 34 grams (0.5 mole) of boron trifluoride. The vessel was heated at 25° C. for 1 hour and at 50° C. for 1 hour. The viscous reaction product was discharged into a saturated aqueous sodium acetate solution and was further purified as in Example 1.

There was obtained 8.25 grams of a tan solid polymer whose infrared spectrum was in agreement with that expected for the poly(hydroxyketone). The polymer was soluble in DMAC and had an inherent viscosity of 0.97 (0.5% solution in DMAC at 30° C.). The polymer stick temperature was 315° C.

A solution of 2 grams of the polymer in 18 milliliters of DMAC was cast to a film with a 20-mil doctor knife. The film was dried in an air oven at 75° C. for 5 minutes and at 100° C. for 1 hour. The film was removed from the casting plate by immersion in water and was clamped to a frame, following which it was dried in a vacuum oven at 125° C. for 20 hours. The resulting brownish-colored film was clear and tough, and had a zero strength temperature of 328° C. Physical properties were as follows: at 28° C., a modulus of 567K p.s.i., an elongation of 1.5%, and a tenacity of 8.1K p.s.i.; at 105° C., a modulus of 590K p.s.i., an elongation of 1.6%, and a tenacity of 7.3K p.s.i.

EXAMPLE 5

A 150-milliliter pressure vessel was charged with 5.6 grams (0.03 mole) of 4,4'-biphenol, 6.1 grams (0.03 mole) of terephthaloyl chloride, 10 grams (0.5 mole) of hydrogen fluoride and 17 grams (0.25 mole) of boron trifluoride. The vessel was heated at 25° C. for 0.5 hour, at 50° C. for 1 hour and at 75° C. for 1 hour. The rubber-like reaction product was discharged into a saturated aqueous sodium acetate solution and further purified as in Example 1. There was obtained 9.1 grams of a greenish polymer whose infrared spectrum was in agreement with that expected for the poly(hydroxyketone). The polymer was soluble in concentrated sulfuric acid and had an inherent viscosity of 0.41 (0.5% solution by weight in concentrated sulfuric acid at 30° C.).

EXAMPLE 6

A 500-milliliter silver-lined stainless-steel pressure vessel was charged with 5.6 grams (0.03 mole) of 4,4'-biphenol, 6.1 grams (0.03 mole) of isophthaloyl chloride, 20 grams (1.0 mole) of hydrogen fluoride and 34 grams (0.5 mole) of boron trifluoride. The vessel was heated at 50° C. for 20 hours. The solid reaction product was discharged into an ice-cold saturated aqueous solution of sodium acetate. The solid product was further purified as in Example 1. There was obtained 8.5 grams of a greenish polymeric solid whose infrared spectrum was in agreement with that expected for the poly(hydroxyketone). The polymer was soluble in concentrated sulfuric acid and had an inherent viscosity of 0.31 (0.5% by weight solution in concentrated sulfuric acid at 30° C.).

EXAMPLE 7

A pressure vessel was charged with 5.05 grams (0.025 mole) of 4,4'-dihydroxydiphenyl ether, 5.07 grams (0.025 mole) of isophthaloyl chloride, 20 grams (1.0 mole) of hydrogen fluoride and 34 grams (0.5 mole) of boron trifluoride. The vessel was heated at 100° C. for 2 hours. The reaction product was discharged into a saturated aqueous sodium acetate solution. The precipitate was collected by filtration, suspended in water and heated under reflux for 30 minutes. The solid was again collected by filtration, suspended in methylene chloride and heated under reflux for 30 minutes. The product was again collected by filtration, and dried. There was obtained 8.4 grams of a brownish polymeric solid whose infrared spectrum was in agreement with that expected for the poly (hydroxyketone). The product was dissolved in DMF and filtered in order to remove a small amount of insoluble material. The polymer was reprecipitated by pouring the filtrate into water, and was collected by filtration and dried under vacuum in an oven. There was recovered 6.3 grams of a brown solid whose infrared spectrum was in agreement with that expected for the poly(hydroxyketone). The inherent viscosity of the polymer was 0.27 (0.5% by weight solution in DMF at 30° C.). The polymer also was soluble in DMAC.

For comparison, a control sample of a non-hydroxylated polymeric ketone of inherent viscosity of about 0.55 prepared by the procedure described above by reacting equimolar amounts of diphenyl ether and isophthaloyl chloride was found to be insoluble in DMAC. The non-hydroxylated polymer obtained by substituting an 80/20 mixture by weight of terephthaloyl chloride and isophthaloyl chloride for the isophthaloyl chloride above also was insoluble in DMAC.

EXAMPLE 8

In accordance with the above-outlined general procedure, a 150-milliliter pressure vessel was charged with 5.8 grams (0.03 mole) of naphthalene - 1,5 - diol, 6.1 grams (0.03 mole) of isophthaloyl chloride, 20 grams (1.0 mole) of hydrogen fluoride and 34 grams (0.5 mole) of boron trifluoride. The vessel was heated at 75° C. for 4 hours. The reaction product was discharged into a saturated aqueous sodium acetate solution and further purified like the product of Example 1. There was obtained 8.25 grams of a yellow polymeric solid whose infrared spectrum was in agreement with that expected for the poly(hydroxyketone).

EXAMPLE 9

In accordance with the above general procedure a 150-milliliter stainless steel pressure vessel was charged with 1.86 grams (0.01 mole) of 2,2'-biphenol, 3.25 grams (0.01 mole) of naphthalene - 1,5 - disulfonyl chloride, 20 grams (1.0 mole) of hydrogen fluoride and 34 grams (0.5 mole) of boron trifluoride. The vessel was heated at 25° C. for 1 hour, at 50° C. for 2 hours and at 75° C. for 1 hour. The liquid reaction product was discharged into a saturated aqueous sodium acetate solution. The solid precipitate which formed was further purified like the product of Example 1. There was obtained 1.65 grams of a brown polymeric solid whose infrared spectrum was indicative of poly(hydroxysulfone). The polymer was largely soluble in pyridine, dimethylsulfoxide, DMAC, DMF and sym-dichlorotetrafluoroacetone monohydrate.

A repeat of the foregoing using double the amount of the phenol and sulfonyl chloride reactants where the maximum temperature used was 50° C. resulted in a poly(hydroxysulfone) polymer having an inherent viscosity of 0.21 (0.5% by weight solution in DMAC at 30° C.).

EXAMPLE 10

In accordance with the above general procedure, a 150-milliliter stainless-steel pressure vessel was charged with 5.6 grams (0.03 mole) of 2,2'-biphenol, 5.94 grams (0.03 mole) of 2,5-dihydroxyterephthalic acid, 20 grams (1.0 mole) of hydrogen fluoride and 34 grams (0.5 mole) of boron trifluoride. The vessel was heated at 25° C. for 1 hour and at 50° C. for 1 hour. The reaction product was discharged into a saturated aqueous sodium acetate solution. The precipitate which formed was collected by filtration, washed with water, 5% aqueous sodium bicarbonate solution, water, 5% aqueous hydrochloric acid and water, heated in water under reflux for 30 minutes, collected by filtration and dried under vacuum. There was obtained 1.07 grams of a brownish polymeric solid whose infrared spectrum was in agreement with that expected for the poly(hydroxyketone). The polymer was soluble in DMF, DMAC and pyridine.

EXAMPLE 11

Samples of the polymer products prepared hereinabove were evaluated as bonding agents for bonding stainless steel strips. Test specimens of stainless steel strips of ½-inch x 2 inches dimension and 20 mils thickness were washed with methyl ethyl ketone (MEK). After removal of any MEK residue, the stainless steel strips were dipped for about 10 minutes into a solution of chromic acid maintained at about 65° C. The stainless steel strips were next dried in an air oven maintained at about 150° C. Polymer solutions indicated in Table 1 below were coated onto an area of about ½-inch x ½-inch at one end of two stainless steel strips. The coated strips were preheated in an air oven for a period indicated in Table 1 below to provide a tacky coating of the polymer. The coated ends of two stainless steel strips were juxtaposed and pressed together under the conditions indicated in Table 1 below.

TABLE 1.—ADHESIVE BONDING STRENGTH TEST RESULTS FOR STAINLESS STEEL TEST SPECIMENS

| Polymer Sample | Solvent[1] | Pre-heat time, sec. | Press pressure, tons | Press Temp., °C. | Pressing Time, min. | Bond | Seal strength, lb. |
|---|---|---|---|---|---|---|---|
| Example 1 | DMAC | 30 | 5 | 175 | 5 | Yes | 460 |
| Control, Example 1 | 4FK.H₂O | 30 | 5 | 175 | 5 | No | |
| Example 2 | DMAC | 30 | 5 | 175 | 5 | Yes | 388 |
| Control, Example 2 | 4FK.H₂O | 30 | 5 | 175 | 5 | No | |
| Example 4 | DMAC | 30 | 5 | 175 | 5 | Yes | 876 |
| Control, Example 4 | 4FK.H₂O | 30 | 5 | 175 | 5 | No | |
| Do | 4FK.H₂O | 30 | 5 | 225 | 5 | No | |

[1] All DMAC (N,N-dimethylacetamide) solutions were prepared as 5% solutions by weight of the specified polymer in DMAC.
All 4FK.H₂O (sym-dichlorotetrafluoroacetone monohydrate) solutions were prepared as 10% solutions by weight of the specified polymer in 4FK.H₂O.

As shown in Table 1 above, the hydroxylated polymer of the present invention exhibit superior adhesive characteristics over the non-hydroxylated control polymers.

EXAMPLE 12

Samples of the polymer products prepared hereinabove were subjected to adhesive bonding tests utilizing aluminum strips. Test specimens of aluminum strips of ½-inch x 2 inches dimension and 20 mils thickness were washed with methyl ethyl ketone (MEK). After removal of any MEK residue, the aluminum strips were dipped for about 10 minutes into a solution of chromic acid maintained at about 65° C. The aluminum strips were next dried in an air oven maintained at about 150° C. The polymers indicated in Table 2 below were spread in powder form on an area measuring about ½-inch x ½-inch at one end of the aluminum strips. The ends of two aluminum strips covered with the polymer powder were juxtaposed and pressed together under the conditions indicated in Table 2 below.

TABLE 2.—ADHESIVE BONDING STRENGTH TEST RESULTS FOR ALUMINUM TEST SPECIMENS

| Polymer sample | Pre-heat time, sec. | Press pressure, tons | Pressing time, sec. | Pressing temp.,° C. | Polymer stick temp.,° C. | Bond | Bond strength, lb. |
|---|---|---|---|---|---|---|---|
| Example 2 | 30 | 15 | 120 | 215 | 212 | Yes | 59.5 |
| Control, Example 2 | 30 | 15 | 120 | 175 | 162 | Yes | 31.8 |
| Example 4 | 30 | 15 | 120 | 250 | 241 | Yes | >100.0 |
| Control, Example 4 | 30 | 15 | 120 | 185 | 177 | Yes | 36.7 |
| Example 7 | 30 | 15 | 120 | 135 | 119 | Yes | 30.5 |
| Control, Example 7 | 30 | 15 | 120 | 150 | 147 | No | |
| Do | 30 | 15 | 120 | 175 | 147 | No | |
| Do | 30 | 15 | 120 | 200 | 147 | Yes | >100.0 |

As shown in Table 2 above, the hydroxylated polymers of the present invention exhibit superior adhesive characteristics over the non-hydroxylated control polymers.

From the foregoing discussion, description and data, it is evident that the present invention provides important new polymers. These polymers are good ultraviolet light screening materials, and also may be used as polymeric antioxidants. In the latter utility they have an advantage over typical antioxidants since they are non-volatile and non-fugitive. In addition they could be used as electron-exchange membranes (when in film form) and resins.

Properties indicated in the foregoing examples are determined as follows:

The inherent viscosity is measured at 30° C. at a concentration of 0.5% by weight of the polymer in a suitable solvent e.g., concentrated sulfuric acid. To calculate inherent viscosity, the viscosity of the polymer solution is measured relative to that of the solvent alone.

Inherent viscosity $$= \frac{\text{natural logarithm} \frac{\text{Viscosity of solution}}{\text{Viscosity of solvent}}}{C}$$

where C is the concentration expressed in grams of polymer per 100 milliliters of solution. As known in the polymer art, inherent viscosity is directly related to the molecular weight of the copolymer.

Tensile strength, elongation and tensile modulus: These measurements are determined at 23° C. unless otherwise indicated, and 50% relative humidity. The are determined by elongating a film sample at a rate of 100% per minute until the sample breaks. The force applied at the break in pounds/square inch (p.s.i.) is the tensile strength. The elongation is the percent increase in the length of the sample at breakage. Initial tensile modulus in p.s.i. is directly related to film stiffness. It is obtained from the slope of the stress-strain curve at the elongation of 1%; both tensile strength and initial tensile modulus are based upon the initial cross-sectional area of the sample.

Zero strength temperature: The zero strength temperature is that temperature at which a film supports a load of 20 lbs./square inch of film cross-sectional area for no more nor less than 5±0.5 seconds. The test is carried out by placing the sample in contact with a heated bar, the proper load being previously applied, and determining the length of time required for failure. This is carried out at various temperatures until the zero strength temperature is determined.

Stick temperature on a melting bar is determined as follows: A metal bar is provided with an arbitrary linear scale, a resistance heater at one end, and a series of thermocouples attached at various points along the bar. By means of a selector switch and a potentiometer, the temperature at any point of attachment can be read. The bar is heated to a temperature range (determined by trial and error) wherein the polymer melts at one end but not at the other. The point on the bar where the polymer just starts to stick or melt is noted, and the temperature of this point is determined or interpolated from the temperatures at the two nearest thermocouples, assuming that the temperature gradient between those two points is linear.

While the invention has been described with preferred embodiments and detail, it should be evident that changes can be made without departing from its scope.

What is claimed is:
1. A polymer of the structural formula:

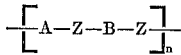

where $n$ is a number sufficient to provide a polymer having an inherent viscosity high enough to form self-supporting polymer shapes; A is selected from the group consisting of:

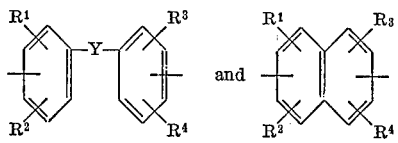

where $R^1$, $R^2$, $R^3$ and $R^4$ are of the group consisting of hydrogen, hydroxy and alkyl of 1 to 4 carbon atoms and at least one of said $R^1$, $R^2$, $R^3$ and $R^4$ is hydroxy; Y is selected from the group consisting of a covalent bond and —O—; Z is selected from the group consisting of:

and

and B is selected from the group consisting of:

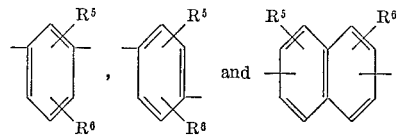

where $R^5$ and $R^6$ are selected from the group consisting of halogen, hydroxy and hydrogen.

2. A polymer according to claim 1 in the form of a film.

3. A polymer of the structural formula:

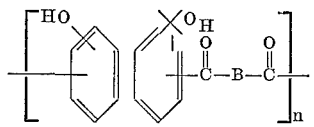

where $n$ is a number sufficient to provide a polymer having an inherent viscosity high enough to form self-supporting polymer shapes; and B is selected from the group consisting of:

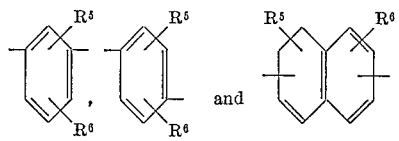

where $R^5$ and $R^6$ are selected from the group consisting of halogen, hydroxy and hydrogen.

4. A polymer according to claim 3, having an inherent viscosity of at least 0.2, measured on a 0.5% by weight solution of the polymer in dimethyl formamide at 30° C., in the form of a film.

References Cited

UNITED STATES PATENTS

| 3,065,205 | 11/1962 | Bonner | 260—63 |
| 3,441,538 | 4/1969 | Marks et al. | 260—47 |
| 3,442,857 | 5/1969 | Thornton | 260—47 |

FOREIGN PATENTS

| 971,227 | 9/1964 | Great Britain. |
| 1,383,048 | 11/1964 | France. |

WILLIAM H. SHORT, Primary Examiner

L. P. QUAST, Assistant Examiner

U.S. Cl. X.R.

117—124, 132; 161—213; 260—30.2, 32.6, 32.8, 49, 61, 78.4